United States Patent [19]

Leber

[11] 4,231,250
[45] Nov. 4, 1980

[54] APPARATUS FOR CONTINUOUS MEASUREMENT OF THE LIQUID LEVEL IN A CONTAINER

[75] Inventor: Dieter Leber, Eschborn, Fed. Rep. of Germany

[73] Assignee: VDO Adolf Schindling AG, Frankfurt, Fed. Rep. of Germany

[21] Appl. No.: 51,813

[22] Filed: Jun. 25, 1979

[30] Foreign Application Priority Data

Aug. 18, 1978 [DE] Fed. Rep. of Germany ....... 2835744

[51] Int. Cl.$^3$ ............................................. G01F 23/28
[52] U.S. Cl. ................................................. 73/290 V
[58] Field of Search ........................ 73/290 R, 290 V

[56] References Cited

U.S. PATENT DOCUMENTS

| | | | |
|---|---|---|---|
| 3,133,442 | 5/1964 | Werner | 73/290V |
| 3,372,592 | 3/1968 | Gravert | 73/290 V X |
| 3,874,236 | 4/1975 | Reck | 73/290 V |

FOREIGN PATENT DOCUMENTS 2839634  3/1979  Fed. Rep. of Germany ........ 73/290 V Primary Examiner—Gerald Goldberg
Assistant Examiner—Joseph W. Roskos
Attorney, Agent, or Firm—Otto John Munz

[57] ABSTRACT

An apparatus is disclosed for the continuous measurement of the level of liquid in a container, wherein a flexible cable extends into close proximity or engagement with the floor of the container and comprises the oscillation determining element of an oscillator. The cable has a length greater than the distance between its mount to the container and the bottom of the container, and is doubled over at least part of its length to form an arc or loop at the container floor. A support engages the cable adjacent the container floor and holds the cable so that the arc or loop maintains its position relative to the container floor even though the container floor may sag or bulge, or the spacing between the floor and top of different containers varies because of manufacturing tolerances and the like.

10 Claims, 5 Drawing Figures

APPARATUS FOR CONTINUOUS MEASUREMENT OF THE LIQUID LEVEL IN A CONTAINER

BACKGROUND OF THE INVENTION

The invention relates to an apparatus for continuously measuring the liquid level in a container, particularly a fuel tank of a motor vehicle, having a sensor such as a flexible, multiple-strand band or strap type cable arranged on a mount, with the cable being the oscillation-determining element of an oscillator, the output of which communicates with a control and/or display stage.

In known apparatus of this type, the end of the sensor toward the floor of the container is provided with a bridge which connects the individual strands of the cable, and this end is connected with a rod secured on the mount, in order to reliably prevent a movement of the end of the sensor which might influence the indication of liquid level. In this manner, the effective portion of the sensor ends at a distance above the container floor, as determined by these attachment and connection devices, so that when the container is empty a residual quantity remains in the container that is not detected with the sensor. This residual quantity is also not constant in containers of similar construction, but changes from container to container on the basis of common manufacturing tolerances. Particularly in flat containers with large volume capacity, it can occur that the floor of the container plastically deforms over time under the weight of the fuel acting thereon when the container is full, thus bulging downward. In this manner, there is a further increase over time of the fuel volume not detected with the measurement apparatus.

Particularly in those arrangements wherein a display is desired of the distance which can be yet driven with the fuel supply present in the fuel tank when a certain manner of driving is maintained, it is an absolute requirement that the quantity of fuel in the fuel tank, and particularly the residual quantity, is determined precisely, because otherwise a too large or too small distance will be displayed.

SUMMARY OF THE INVENTION

It is therefore an objective of the invention to form an apparatus of the above-described type in such a manner that a precise determination of the residual quantity in a container can be performed therewith.

This objective is achieved according to the invention in that the length of the sensor is larger than the length necessary to fully measure the container, and means are provided for positioning the end of the sensor at a constant distance to the floor of the container.

Through these measures, the effective portion of the sensor reaches directly to the floor of the container, even if the floor should bulge over time or the height of the container should vary within the manufacturing tolerances, because of the positive support of the sensor against the floor of the container. A particular advantage of the invention is that it can be realized with a relatively small expense.

According to an advantageous embodiment of the invention, a rod which extends almost to the floor of the container is mounted to the container via a mount and has a support on its end adjacent the floor of the container in which the end of the sensor is secured to form a sagging arc. The vertex of the sagging arc contacts the container floor with bias, so that the container floor and the arc of the end of the sensor remain in contact with each other even if the container floor should bulge over time. This type of embodiment also has the advantage that important elements of the known apparatus can continue to be used and the expense necessary to realize the embodiment is thus especially low. For optimal adaptation of the apparatus to the container, it is recommended to secure the support to the rod in an axially movable and settable manner. This can be accomplished, for example, by providing the rod with a threaded portion and holding the support between two nuts screwed onto the threaded portion. Furthermore, it has been shown to be effective to provide as the support a plate having at least two parallel slots through which the sensor is guided. This type of slotted plate allows an especially quick installation of the end of the sensor and the plate, particularly when the slots are open on one end.

According to another advantageous embodiment of the invention, an element consisting of two telescoping portions which can be axially moved relative to each other and against the force of a spring is provided on the mount, the free end of which holds the sensor to the container floor. This type of embodiment is indeed somewhat more expensive than that previously described, but has the advantage that the end of the sensor remains in contact with the floor of the container even when there is a pronounced bulge of the floor of the container, which is not the case under all circumstances with the previously described embodiment. In addition, this type of embodiment can be used for containers of different shapes or heights. It has been proven effective to secure the end area of the sensor to the element in order to prevent the sensor from working out between the element and the container floor over time. In order to be able to fully use the total stroke of the element, it is recommended that the end of the sensor toward the mount be secured so as to be longitudinally movable and settable in the mount.

The element itself can be formed as a rod, or, which is particularly advantageous, as a tube, whereby the sensor is then arranged withing the element. This last-described embodiment has the advantage that the sensor is protected by the tube walls especially from liquid movements in the fuel tank, as occurs during braking and acceleration as well as when negotiating curves.

The attachment of the end of the sensor in the area of the floor of the container to the support or the element makes it necessary to insulate this end of the sensor from the fuel. This requires a separate operation and thus increases the production costs of the apparatus. This disadvantage is avoided according to a further concept of the invention in that the length of the sensor is about twice as large as the length necessary to fully measure the container and both ends of the sensor are secured to the mount. In this embodiment, the flexible band cable is led from the mount to the support or to the end of the element facing the container floor, and from there back up to the mount.

With this measure, a further substantial improvement of the invention is achieved. It is of course known that the oscillator frequency is dependent on the capacity of the sensor and the total frequency change is dependent on the maximum possible capacity change of the sensor between the completely immersed and completely unimmersed conditions, and namely the oscillator base frequency is higher and the frequency change is smaller the shorter the sensor or band cable is. Especially in flat containers such as are being used more and more often in motor vehicles, this leads to a relatively high oscillator base frequency, which lies at the limit of legally allowable frequencies for such apparatus, and to a relatively small frequency change, which under certain circumstances can cause difficulties with its determination and display. By means of the measure according to the invention of using an excessively long sensor, a low oscillator base frequency and a sufficiently large frequency change between the maximum and minimum fuel levels is achieved, even in flat containers. The limiting of the oscillator base frequency made possible by the measures according to the invention also has an advantageous effect if the invention is employed in conjunction with microprocessors, because they can then be triggered directly and without a frequency conversion. The latter is the case, for example, if the measuring apparatus is used as a sender for a remaining distance display, which generally operate with a microprocessor.

DETAILED DESCRIPTION OF THE PREFERRED EMBODIMENTS

Figure 1:
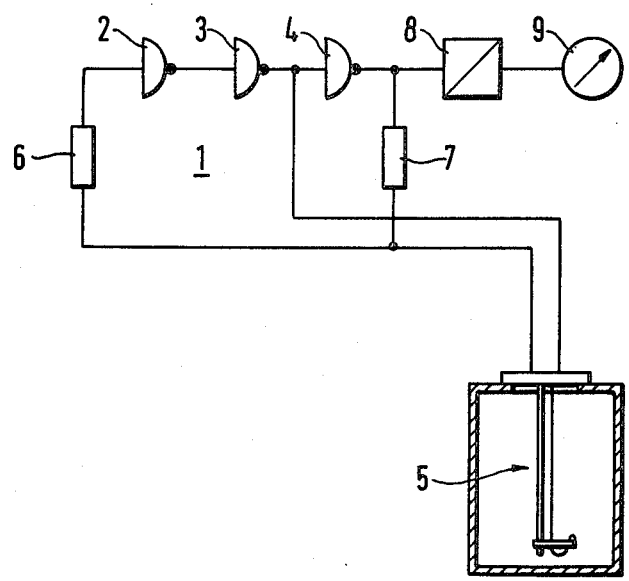
FIG. 1 is a circuit diagram of the apparatus.

As can be seen from FIG. 1, the apparatus comprises an oscillator 1, which is formed of three series-connected inverters 2,3 and 4. The output of the inverter 3 is connected with the input of the inverter 2 by means of the sensor 5 and a first resistor 6 and with the output of the inverter 4 by means of a second resistor 7. A display instrument 9 is connected to the output of the inverter 4 by means of a monostable multivibrator 8.

Figure 2:
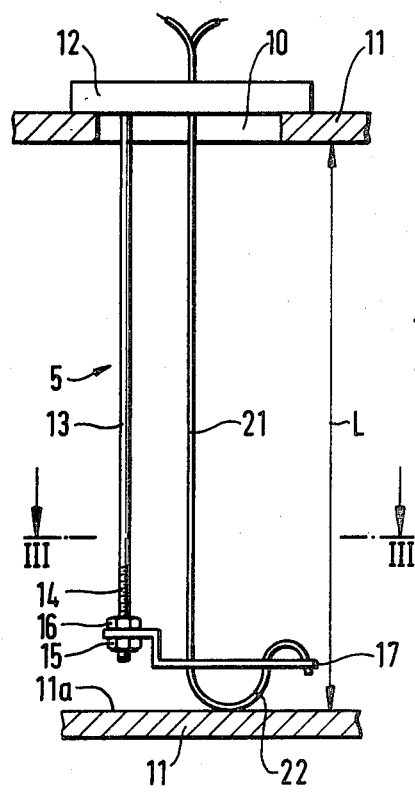
FIG. 2 is a side view of a sensor of the apparatus according to FIG. 1.
Figure 3:
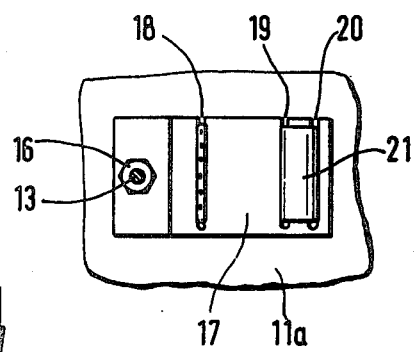
FIG. 3 is a section through the sensor according to FIG. 2, along the line III—III.

The sensor 5 shown in FIGS. 2 and 3, which is placed in the container 11 through an opening 10, has a flange or mount 12, to which a rod 13 is attached which almost reaches the container floor 11a. The free end of the rod 13 is provided with a threaded portion 14, on which a nut 15 and a lock nut 16 are screwed, between which a plate-like support 17 is held. This support 17 is provided with three slots 18,19 and 20, which are open on one end and closed on the other. A flexible, multi-strand band cable 21 is pushed between these slots to form a sagging arc 22. The two slots 19 and 20 basically serve to reliably anchor the end of the band in the support 10 against an unintentional disengagement. The vertex of the sagging arc 22 contacts the floor 11a of the container 11. The end of the band cable 21 opposite the support 17 is held in the mount 12. As seen, the length of the band cable 21 is larger than the length L actually necessary to fully measure the container. Reference should be made to DE-OS No. 26 45 716 with regard to the special construction of the band cable.

Figure 4:
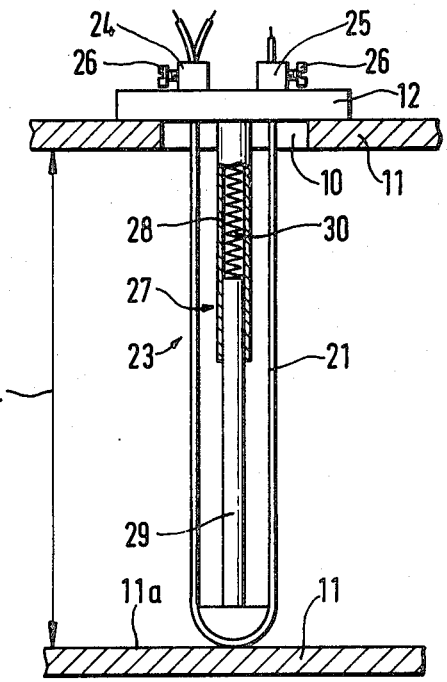
FIG. 4 is a side view of another sensor of the apparatus according to FIG. 1.

In the embodiment according to FIG. 4, the sensor 23 contains a band cable 21, whose length is about twice as large as the length L actually necessary to fully measure the container. The two ends of the band cable 21 are held in respective clamps 24 and 25. By loosening one of the screws 26 of the clamps 24 or 25 the total length of the band cable 21 can be changed. The clamps best form a one-piece unit with the mount 12.

Further, a tension element 27 is attached to the mount 12, which consists of a tube element 28 and a rod element 29, which are mounted so as to be telescopically collapsed relative to each other. In the tube element 28 is a pressure spring 30, which presses the rod element 29 and the portion of the band cable 21 wound about its end against the container floor 11a.

Figure 5:
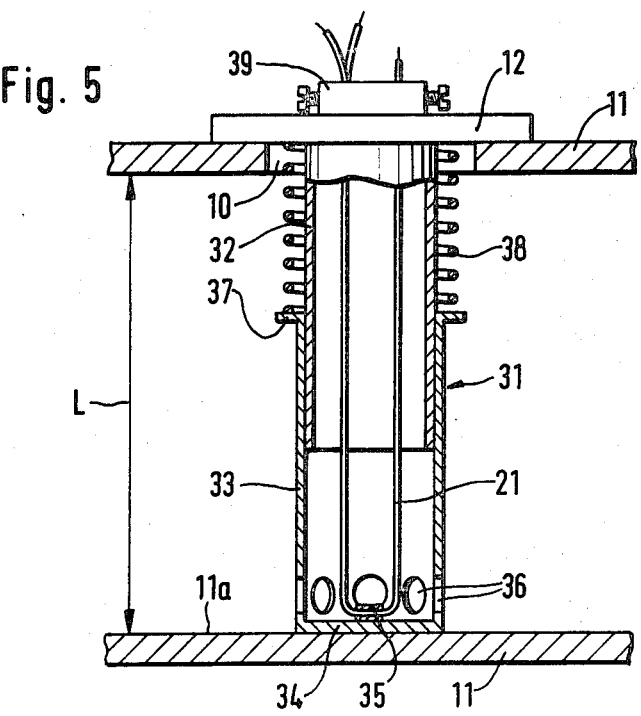
FIG. 5 is a further sensor of the apparatus according to FIG. 1.

In the embodiment according to FIG. 5, in turn, the length of the band cable is chosen about twice as large as the length L necessary to fully measure the container. In this embodiment, the band cable is inside a tubular element 31, which consists of a tube extension 32 and a tube element 33 slidably mounted thereon. The tube element 33 is provided with a floor 34 to which a holding arm or bracket 35 is attached for securing or holding the band cable 21. A plurality of openings 36 are present in the casing of the tube element 33 in the area of the floor 34, through which the fuel can pass into the inner chamber of the element 31. The end of the tube element 33 opposite the floor 34 is provided with a collar 37. A pressure spring 38 is present between this collar 37 and the mount 12, which presses the tube element 33 against the floor 11a of the container 11 when the sensor is in place. On the upper side of the mount 12, in turn, is a clamping device 39 for the two ends of the band cable 21.

What is claimed is:

1. Apparatus for continuous measurement of the liquid level in a container having a floor, particularly a fuel tank of a motor vehicle, wherein a flexible, multiple-strand band cable is secured to the container and is an oscillation-determining element of an oscillator, the output of which communicates with a device to be operated thereby, such as a control or display stage, and wherein the length of the sensor is larger than the length required for the sensor to reach to the floor of the container, said sensor having at least a portion thereof doubled upon itself to define an arc or loop at the floor of the container, and support means engaging the sensor and holding the arc or loop means in constant, predetermined relationship relative to the container floor.

2. Apparatus as claimed in claim 1, wherein the support means includes a rod which reaches approximately to the container floor, the end of the rod adjacent the container floor having a support in which the end of the sensor is anchored to form the arc.

3. Apparatus as claimed in claim 2, wherein the support is attached to the rod so as to be axially movable and settable relative thereto.

4. Apparatus as claimed in claim 3, wherein the support comprises a plate provided with at least two parallel slots, through which the sensor is guided.

5. Apparatus as claimed in claim 1, wherein the support means comprises an element having two telescopic portions which can be axially moved relative to each other and against the force of a spring, the sensor being held to the container floor by the downward bias of the free end of the element.

6. Apparatus as claimed in claim 5, wherein the arc of the sensor is attached to the element.

7. Apparatus as claimed in claim 1, wherein the support means includes a mount attached to the container, said sensor having at least one end thereof secured in a slidable and settable manner.

8. Apparatus as claimed in claim 5, wherein one of the telescoping portions of the element is formed as a rod.

9. Apparatus as claimed 5, wherein the element is formed as a tube and the sensor is arranged within the element.

10. Apparatus as claimed in claim 7, wherein the length of the sensor is about double the length necessary to fully measure the container and both ends of the sensor are secured to the mount.

* * * * *